(12) United States Patent
Peat

(10) Patent No.: US 12,145,729 B2
(45) Date of Patent: Nov. 19, 2024

(54) GALLEY ISOLATION PANELS

(71) Applicant: B/E Aerospace, Inc., Winston Salem, NC (US)

(72) Inventor: Caroline Peat, Northampton (GB)

(73) Assignee: B/E AEROSPACE, INC., Winston Salem, NC (US)

( * ) Notice: Subject to any disclaimer, the term of this patent is extended or adjusted under 35 U.S.C. 154(b) by 52 days.

(21) Appl. No.: 17/368,452

(22) Filed: Jul. 6, 2021

(65) Prior Publication Data

US 2022/0001989 A1 Jan. 6, 2022

Related U.S. Application Data

(60) Provisional application No. 63/048,354, filed on Jul. 6, 2020.

(51) Int. Cl.
B64D 11/04 (2006.01)
B64D 11/00 (2006.01)

(52) U.S. Cl.
CPC .......... B64D 11/04 (2013.01); B64D 11/0023 (2013.01)

(58) Field of Classification Search
CPC .. B64D 11/04; B64D 11/0606; B64D 11/0023
USPC .......................................................... 49/171
See application file for complete search history.

(56) References Cited

U.S. PATENT DOCUMENTS

| | | | |
|---|---|---|---|
| 6,257,523 B1 * | 7/2001 | Olliges ................ | B61D 17/048 |
| | | | 244/129.5 |
| 6,761,332 B1 * | 7/2004 | Bengtsson ............. | B64D 11/04 |
| | | | 244/119 |
| 8,720,827 B2 * | 5/2014 | Boren ..................... | E06B 3/921 |
| | | | 296/146.13 |
| 8,944,377 B2 * | 2/2015 | McIntosh ................ | B64G 1/60 |
| | | | 244/118.5 |
| 9,254,918 B2 * | 2/2016 | Young .................... | B64D 11/04 |
| 10,231,563 B2 | 3/2019 | Colacecchi | |
| 10,337,228 B1 * | 7/2019 | Matthews ............. | E06B 3/5072 |
| 10,501,186 B2 * | 12/2019 | Seibt ...................... | B64D 11/06 |
| 10,597,160 B2 | 3/2020 | Schliwa et al. | |
| 11,142,321 B2 * | 10/2021 | Dowty .................. | B64C 1/1461 |
| 2001/0050519 A1 * | 12/2001 | Kasuya .................. | B64D 11/04 |
| | | | 312/310 |

(Continued)

FOREIGN PATENT DOCUMENTS

| | | | | |
|---|---|---|---|---|
| CN | 106184699 A | * | 12/2016 | ........... B64C 1/1438 |
| EP | 2736807 B1 | * | 1/2019 | ............ B64D 11/00 |

(Continued)

OTHER PUBLICATIONS

English Translation of CN-106184699-A, (Year: 2016).*

(Continued)

*Primary Examiner* — Joshua J Michener
*Assistant Examiner* — Cindi M Curry
(74) *Attorney, Agent, or Firm* — SNELL & WILMER L.L.P.

(57) ABSTRACT

An isolation system for a galley monument includes a galley monument wall including a pocket and defining at least one entry-way. At least one panel is movably received in the pocket. The panel is configured and adapted to move relative to the pocket between at least one of open position and or closed position.

9 Claims, 3 Drawing Sheets

(56) References Cited

U.S. PATENT DOCUMENTS

| | | | |
|---|---|---|---|
| 2004/0173327 A1* | 9/2004 | Steel | E06B 3/50 |
| | | | 160/210 |
| 2009/0065641 A1* | 3/2009 | Koehn | B64D 11/02 |
| | | | 244/129.5 |
| 2014/0175219 A1 | 6/2014 | Young et al. | |
| 2018/0258686 A1* | 9/2018 | Christenson | E06B 3/5009 |
| 2019/0233114 A1* | 8/2019 | Fullerton | B64D 11/0023 |
| 2019/0329891 A1* | 10/2019 | Bonnefoy | B64D 11/0023 |
| 2020/0223550 A1* | 7/2020 | Hausner | F25D 23/028 |
| 2020/0262562 A1* | 8/2020 | Dowty | B64D 11/0641 |

FOREIGN PATENT DOCUMENTS

| | | | | |
|---|---|---|---|---|
| FR | 3050717 A1 * | 11/2017 | | |
| GB | 2548901 A * | 10/2017 | | B64C 1/1423 |
| WO | WO-2015006678 A2 * | 1/2015 | | B64C 1/14 |
| WO | WO-2017176726 A1 * | 10/2017 | | B64D 11/0606 |
| WO | WO-2018093825 A1 * | 5/2018 | | B60N 2/005 |
| WO | 2019002138 A1 | 1/2019 | | |
| WO | WO-2021084479 A1 * | 5/2021 | | B64D 11/0023 |

OTHER PUBLICATIONS

English Translation of FR-3050717-A1 (Year: 2017).*
Extended European Search Report dated Nov. 30, 2021, issued during the prosecution of European Patent Application No. EP 21184095.4, 6 pages.

* cited by examiner

GALLEY ISOLATION PANELS

CROSS-REFERENCE TO RELATED APPLICATIONS

This application claims priority to and the benefit of U.S. Provisional Application No. 63/048,354, filed Jul. 6, 2020, the entire contents of which are herein incorporated by reference in their entirety.

BACKGROUND

1. Field

The present disclosure relates to galley monuments, and more particularly to contamination reduction and prevention for use in conjunction with galley monuments, for example, galley monuments on an aircraft.

2. Description of Related Art

As a result of the COVID-19 pandemic and subsequent flying restrictions, travel, such as air and train travel, was greatly reduced. The new landscape of the world, post-pandemic may generate a new normal where improving on-board sanitation and cleanliness, in particular in galley areas where food is being prepared, for both the passengers and crew is of the utmost importance in order to ensure healthy and safe travel conditions for the future of commercial transportation. Traditional galley food preparation areas can be open-access and, in certain carrier layouts, offer pass through areas for passengers and crew. In some aircraft or other common carriers, curtain barriers may be available. Curtain barriers, however, provide little real security and may pose its own contamination touch risk.

The conventional techniques have been considered satisfactory for their intended purpose. However, there is an ever present need for improved systems and methods for on-board prevention of contamination, especially when it comes to food preparation.

SUMMARY

An isolation system for a galley monument includes a galley monument wall including a pocket and defining at least one entry-way. At least one panel is movably received in the pocket. The panel is configured and adapted to move relative to the pocket between at least one of open position and or closed position.

In some embodiments, in the closed position, the at least one panel at least partially occludes the entry-way. In the open position, the at least one panel can be received within the pocket to allow passage through the entry-way. The system can include a second galley monument wall opposite from the galley monument wall. The second galley monument wall can include a second pocket and can define a second entry-way opposite from the at least one entry-way across the galley monument.

The at least one panel can include two panels and a hinge positioned between the two panels. The two panels can each define a respective longitudinal axis. An axis of the hinge can be defined parallel to the longitudinal axis. The two panels can be configured and adapted to slide relative to the galley monument wall. A first of the two panels can be configured and adapted to rotate about the hinge relative to a second of the two panels between the closed position and the open position.

The system can include a latch positioned on at least one of the panel or the wall. At least a portion of the latch can be positioned on a side of the wall opposite from an opening of the pocket. The galley monument wall can include at least one cut-out area to expose at least one of an interior of the pocket or the at least one panel. The at least one panel can include a viewing panel.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
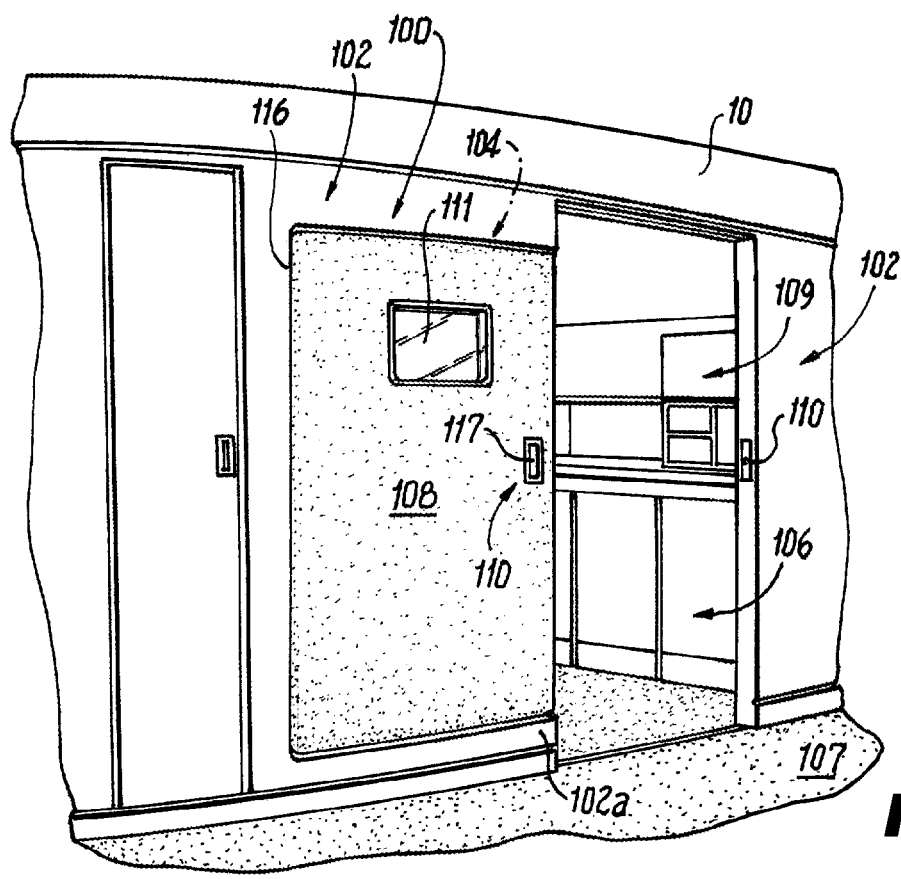
FIG. 1 is a schematic perspective view of an isolation system for a galley monument constructed in accordance with the present disclosure, showing a galley monument wall with a pocket and a sliding panel nested within the pocket in an open position.

Reference will now be made to the drawings wherein like reference numerals identify similar structural features or aspects of the subject disclosure. For purposes of explanation and illustration, and not limitation, a partial view of an embodiment of an isolation system for a galley monument in accordance with the disclosure is shown in FIG. 1 and is designated generally by reference character 100. Other embodiments of systems in accordance with the disclosure, or aspects thereof, are provided in FIGS. 1-5 as will be described. The systems and methods described herein provide an isolation system, such as a sliding and/or folding panel on a side of a galley monument, that provides a physical barrier across the opening to the galley area. This allows for increased safety and security in food preparation, as the panel prevents direct access to food.

Figure 5:
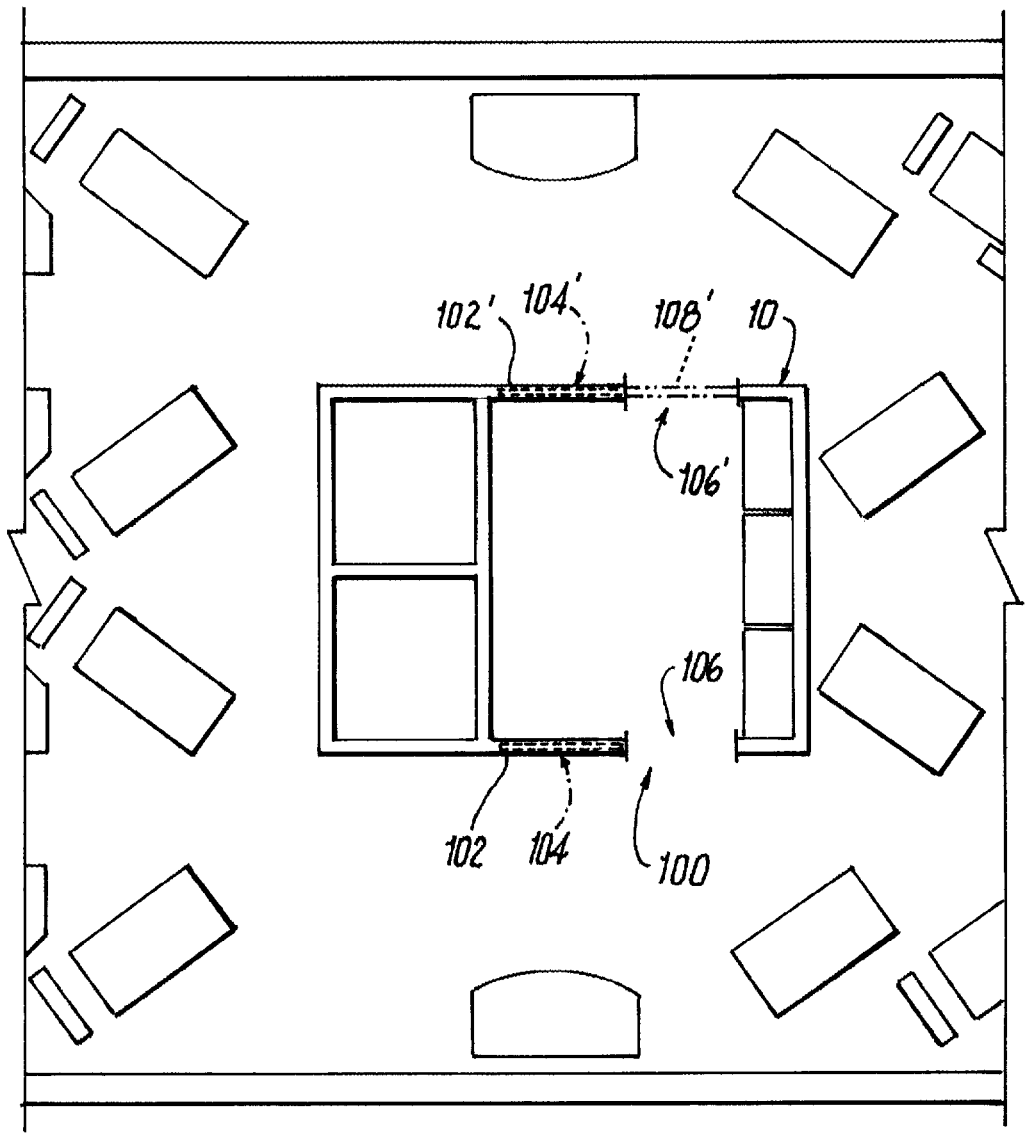
FIG. 5 is a schematic top plan view of the isolation system of FIG. 1, showing the isolation system in a twin-aisle aircraft.

As shown in FIGS. 1 and 5, an isolation system 100 for a galley monument 10 includes a galley monument wall 102 including a pocket 104 and defining at least one entry-way 106. The pocket 104 is defined between two portions 102a and 102b of wall 102. Portion 102a is an aisle side portion and portion 102b is an inner side portion of wall 102. Panel 108 is movably received in the pocket 104 between the two portions 102a and 102b. Portion 102a is shown in FIG. 1 as having a cut-out area 116 to expose at least one of an interior of the pocket 104 and the opposing wall portion 102b (when the panel 108 is in a closed position) or the panel 108 when the panel 108 is in the open position. Cut-out area 116 can allow the panel 108 to be used for advertising or information display. Those skilled in the art will readily appreciate that in accordance with some embodiments, cut-out area 116 may not be included. In that embodiment, the wall portion 102a would entirely cover panel 108 from an aisle side. The panel 108 is configured and adapted to move, e.g., slide along a track or the like, relative to the pocket 104 between an open position, shown in FIG. 1, and a closed position. In the open position, the at least one panel 108 is received within the pocket 104 to allow passage through the entry-way 106 from an aisle 107 into a galley area 109, and out another entry-way 106' (if needed).

Figure 2:
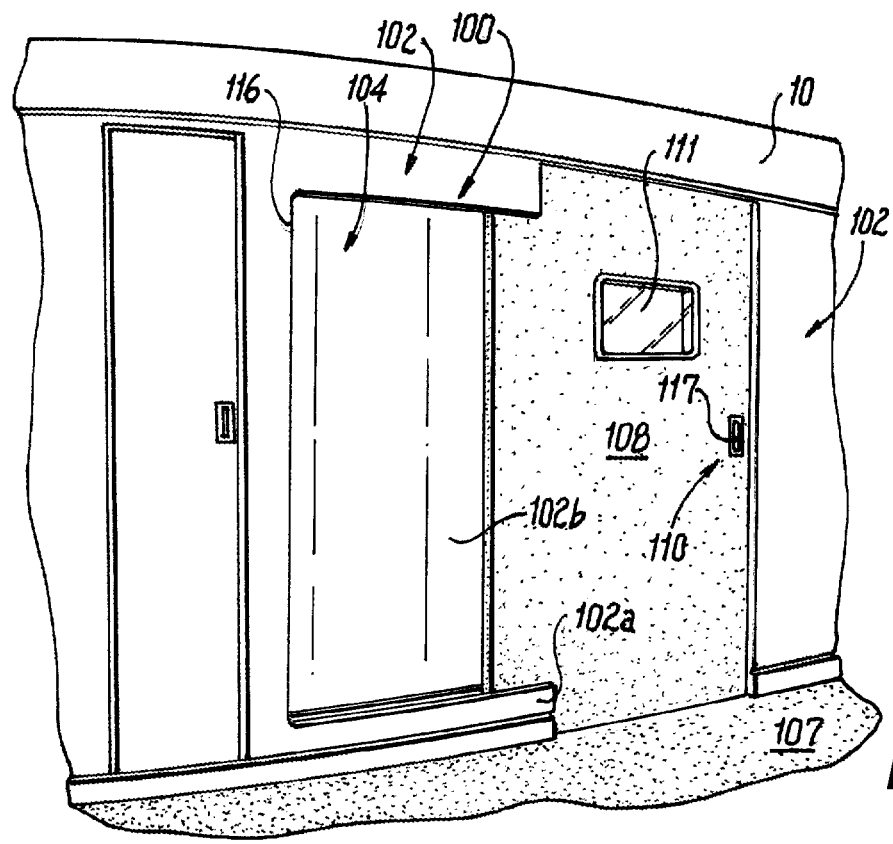
FIG. 2 is a schematic perspective view of the isolation system of FIG. 1, showing the sliding panel extended outward from the pocket in a closed position.

With reference now to FIG. 2, in the closed position, the panel 108 occludes the entry-way 106 such that food preparation in galley area 109 can be separated from passengers or other crew passing through the aisle 107. In this way, contamination during food preparation due to passersby can be reduced and/or avoided. A viewing panel 111 or window is mounted within the panel 108 so that someone, e.g., a crew member, can check for the appropriate time to open the panel 108, or the like. System 100 offers a certifiable solution to increase crew and passenger safety. The pocket-like configuration only takes up minimal additional space and can be retrofit onto existing galley monuments, and/or can offer easy removal in the future if required.

As shown in FIGS. 1-2, system 100 includes a latch 110 positioned on the panel 108 and the wall 102. A portion of the latch 110 is positioned on a side of the wall 102 opposite from an opening of the pocket 104 to mate with the portion of the latch 110 on the panel 108. The latch 110 provides extra security and safety, e.g. would remain closed in a turbulence situation. Latch 110 is also a breakaway latch 110 in case of an in-flight emergency, e.g. a situation where passengers or crew have to get from one aisle to the other, or the like. A handle 117 can be included in conjunction with latch 110, for example as a recessed portion in panel 108.

With reference now to FIG. 5, the system 100 includes a second galley monument wall 102' opposite from the first galley monument wall 102. The second galley monument wall 102' includes a second pocket 104' and panel 108', similar to pocket 104 and panel 108, and defines a second entry-way 106' opposite from the first entry-way 106 across the galley monument 10. While systems and methods described herein are shown in the context of an aircraft galley, those skilled in the art will readily appreciate that isolation systems 100 and 200, described below, can be used in other common carriers, such as train, ship or the like.

Figure 3:
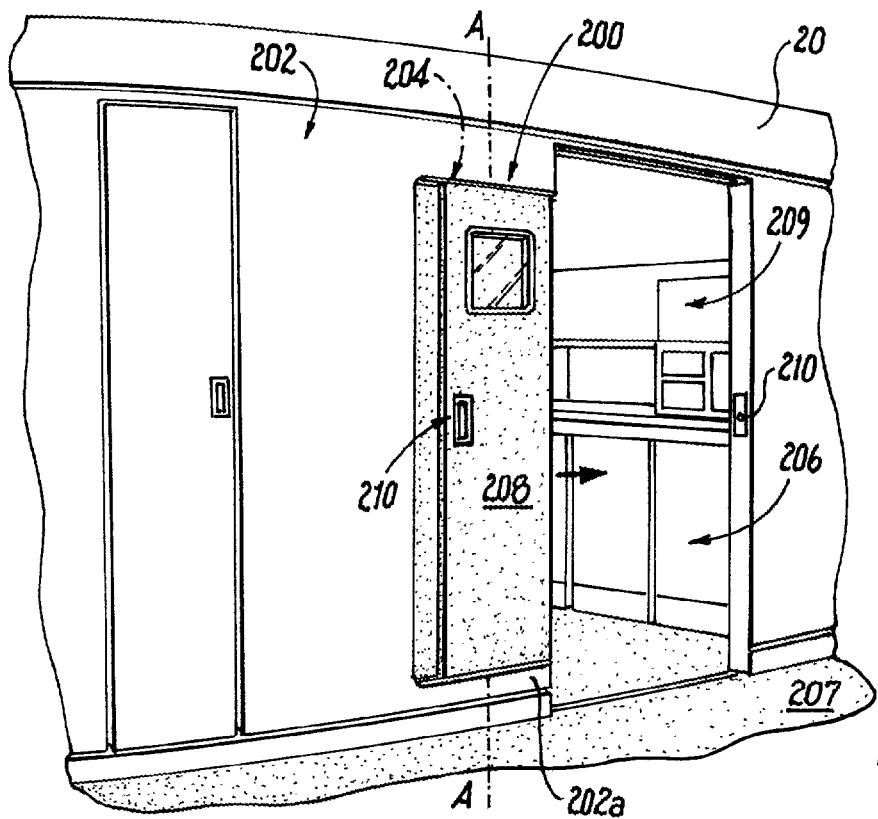
FIG. 3 is a schematic perspective view of an isolation system for a galley monument constructed in accordance with the present disclosure, showing a galley monument wall with a pocket and a sliding foldable panel nested within the pocket in an open position.
Figure 4:
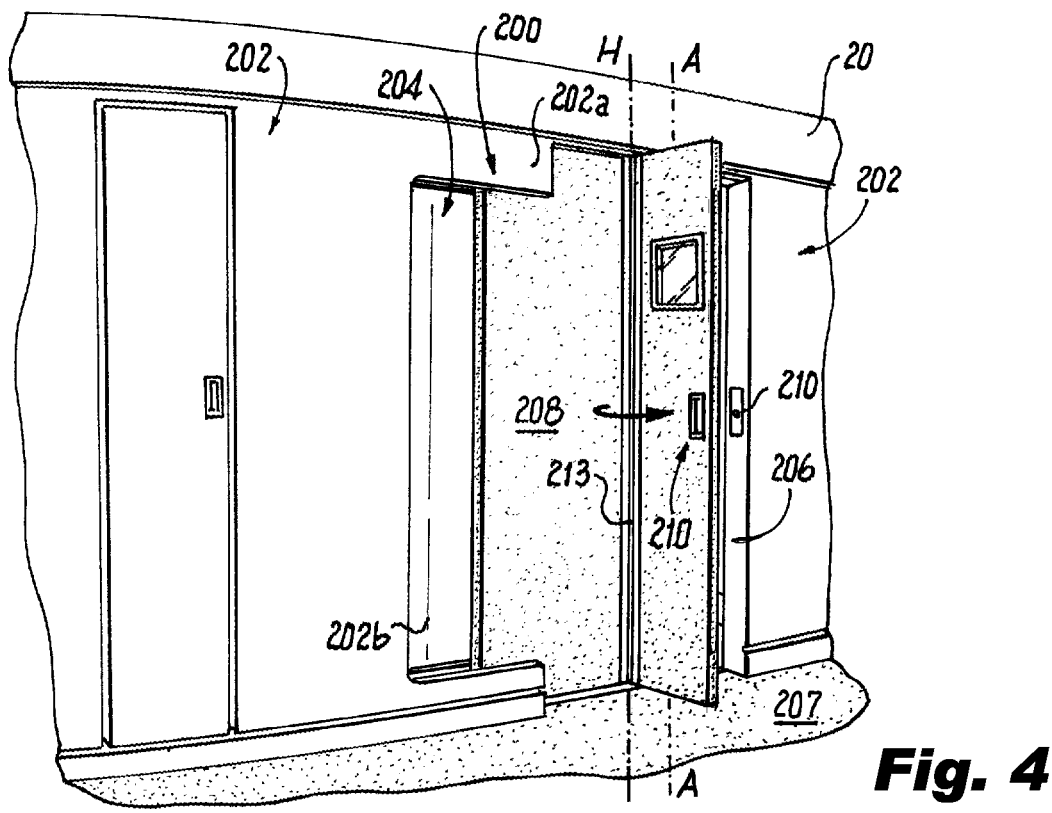
FIG. 4 is a schematic perspective view of the isolation system of FIG. 3, showing the panel slid outward from the pocket and being folded outward to a closed position.

With reference now to FIGS. 3-4, another embodiment of an isolation system 200 for a galley monument 20 includes a galley monument wall 202 including a pocket 204 and defining at least one entry-way 206. The pocket 204 is defined between two portions 202a and 202b of wall 202. Portion 202a is an aisle side portion and portion 202b is an inner side of wall 202 and two panels 208 joined via a hinge 213 are movably received in pocket 204 between the two portions 202a and 202b. The panels 208 are configured and adapted to move relative to the pocket 204 between an open position, shown in FIG. 3, and a closed position, shown partially closed in FIG. 4. In the open position, the panels 208 are received within the pocket 204 to allow passage through the entry-way 206 from an aisle 207 through into a galley area 209.

With continued reference to FIGS. 3-4, each panel 208 defines a respective longitudinal axis A. An axis H of the hinge 213 is defined parallel to the longitudinal axis A. The two panels 208 are configured and adapted to slide relative to the galley monument wall 202. A first of the two panels 208a is configured and adapted to rotate about the hinge 213 relative to a second of the two panels 208b between the closed position and the open position. The embodiment of FIGS. 3-4 may be useful where the galley wall 202 and pocket 204 for storing the panel 208 is smaller than the opening of the entry way 206.

The methods and systems of the present disclosure, as described above and shown in the drawings, provide for isolation systems that provide a physical barrier across the opening to the galley area. This allows for increased security in food preparation, as the panel prevents direct access to food. While the apparatus and methods of the subject disclosure have been shown and described with reference to preferred embodiments, those skilled in the art will readily appreciate that changes and/or modifications may be made thereto without departing from the scope of the subject disclosure. Those skilled in the art will readily appreciate that a combination of both embodiments and/or other multi-stage ejector configurations could be used to meet various mission conditions in an optimal manner.

What is claimed is:

1. An isolation system for a galley monument, the isolation system comprising:
a galley monument wall including a pocket and defining at least one entry-way;
an opening of the pocket disposed on a first side of the galley monument wall; and
at least one panel movably received in the pocket, the at least one panel configured and adapted to move relative to the pocket between at least one of an open position and or closed position, wherein in the closed position, the at least one panel extends from a floor of the entry-way to a ceiling of the entry-way and occludes the at least one entry-way, wherein the at least one panel includes two panels and a hinge positioned between the two panels, wherein the two panels includes a first panel and a second panel, the second panel including a handle, wherein the second panel is configured to rotate about a hinge axis such that the first and second panels slide into the pocket together, wherein the pocket is smaller than an opening of the entryway, wherein each panel defines a respective longitudinal axis, wherein the opening of the pocket is smaller than each panel along the longitudinal axis.

2. The system as recited in claim 1, wherein in the open position, the at least one panel is received within the pocket to allow passage through the at least one entry-way.

3. The system as recited in claim 1, further comprising a second galley monument wall opposite from the galley monument wall, wherein the second galley monument wall includes a second pocket and defines a second entry-way opposite from the at least one entry-way across the galley monument.

4. The system as recited in claim 1, wherein an axis of the hinge is defined parallel to the respective longitudinal axes.

5. The system as recited in claim 1, wherein the two panels are configured and adapted to slide relative to the galley monument wall and wherein a first of the two panels is configured and adapted to rotate about the hinge relative to a second of the two panels between the closed position and the open position.

6. The system as recited in claim 1, further comprising a latch positioned on at least one of the panel or the wall.

7. The system as recited in claim 6, wherein at least a portion of the latch is positioned on a side of the wall opposite from an opening of the pocket.

8. The system as recited in claim 1, wherein the galley monument wall includes at least one cut-out area to expose at least one of an interior of the pocket or the at least one panel.

9. The system as recited in claim 1, wherein the at least one panel includes a viewing panel.

\* \* \* \* \*